Oct. 19, 1943.　　　H. A. SATTERLEE　　　2,331,934
SPEED MEASURING AND INDICATING
Filed Sept. 14, 1940

INVENTOR
Howard A. Satterlee
BY
ATTORNEY

Patented Oct. 19, 1943

2,331,934

UNITED STATES PATENT OFFICE 2,331,934

SPEED MEASURING AND INDICATING

Howard A. Satterlee, Needham, Mass., assignor to Submarine Signal Company, Boston, Mass., a corporation of Maine Application September 14, 1940, Serial No. 356,861

8 Claims. (Cl. 175—183)

The present invention relates to a shaft speed measuring and indicating apparatus and more particularly to the measurement and continuous indication of propeller-shaft speed.

Figure 1:
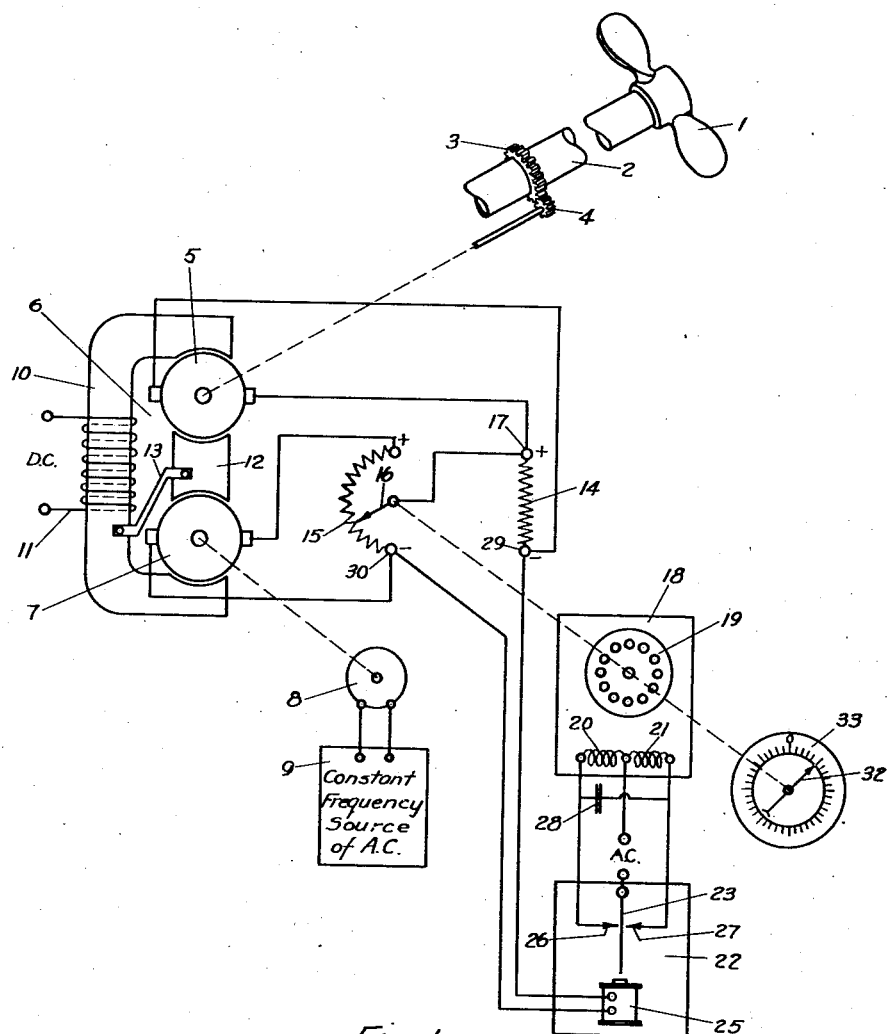
Figure 2:
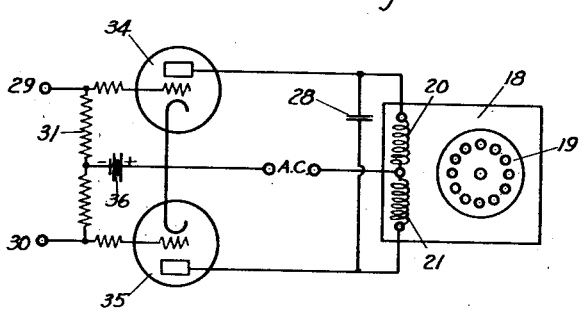

The various objects and features of my invention as well as the manner of its operation will best be understood from the following description taken in connection with the accompanying drawing in which Fig. 1 illustrates the invention in schematic form and Fig. 2 schematically illustrates a modification of a portion of Fig. 1.

As shown in Fig. 1 the shaft 2 of a ship's propeller 1 is arranged through suitable gearing, as, for example, the four-to-one step-up gears 3 and 4, to drive one armature 5 of a double armature direct current generator 6. The second armature 7 of the generator 6 is driven at a constant speed by any suitable means, as, for example, the synchronous motor 8 supplied with energy from a constant frequency source of alternating current 9.

The direct current generator 6 may be arranged in any suitable manner to provide the same magnetic flux through both of the armatures 5 and 7. The generator 6 may, for example, be provided with a two-pole permanent magnet 10 or the magnet may be excited by a field winding 11 supplied from a source of direct current. The flux path of the magnet is designed to include the two armatures 5 and 7 in series. The magnetic circuit should be designed to have as low a leakage flux as possible and the reluctance of the magnetic path through the armatures between the poles should also be kept as low as possible. To this end, the ends of the magnet poles are preferably shaped to conform to the shape of the armatures, and an element of magnetic material 12 similarly shaped is positioned between the two armatures as indicated in Fig. 1. The armatures 5 and 7 should be carefully supported in ball bearings and accurately aligned so that the airgaps between the armature and the magnetic field elements can be kept as small as possible. If the armatures are made of the same size and their windings have the same number of turns, their output voltages for the same speed of rotation will be equal. If necessary, the output voltages of the two armatures can be equalized by shunting a small portion of the magnetic flux around the armature producing the higher voltage as by means of a strap 13 of magnetic material of suitable reluctance.

The output of the armature 5, which is driven at a speed proportional to that of the shaft whose speed is being measured, is impressed across a resistance 14. The output of the armature 7 which is driven at a constant speed is impressed across a resistance 15. Both the resistances 14 and 15 are preferably of relatively high values so that only a very small current will be taken from the armatures 5 and 7. The resistance 15 is made in the form of a potentiometer and is provided with a movable contact element 16 which is electrically connected to one terminal 17 of the resistance 14 and is mechanically connected, through suitable gearing if desired, to the armature 19 of a reversible motor 18.

The motor 18 may be any suitable type of reversible motor, for example, a shaded pole induction motor with two field windings 20 and 21 having a common terminal connected to one terminal of a source of alternating current. The other terminal of the source is connected to the armature 23 of a neutral position polarized relay 22 having an operating coil 25 and two fixed contacts 26 and 27. Relay 22 is arranged so that when the coil 25 is supplied with current of one polarity, the armature 23 will engage contact 26; while when the coil 25 is energized with current of the opposite polarity, the armature 23 will engage contact 27. Contacts 26 and 27 are connected to the free ends of the field windings 20 and 21. Condenser 28 may be shunted across the field windings to neutralize the inductive effect of these windings. Terminals 29 and 30 of the resistances 14 and 15, respectively, are connected to relay-operating coil 25.

The polarities of the potentials impressed across the resistances 14 and 15 are arranged so that the potential across the resistance 14 opposes that across the resistance 15. The potential across the terminals 29 and 30 is therefore the difference between the potential across resistor 14 and the potential across that portion of the resistor 15 which lies between the contact 16 and terminal 30. The relay coil 25 is thus operated in one direction or the other by this difference potential, depending upon the polarity of the difference potential.

The armature 19 of the motor 18 is not only mechanically connected to the contact 16 but is also arranged, through suitable gearing if desired, to drive the pointer 32 which is provided with a scale 33 which may be calibrated in units of speed of the shaft 2.

The operation of the system is as follows: Since the armature 5 is rotated at a speed proportional to that of the shaft 2, it will produce a potential across the resistance 14 which is also proportional to the speed of the shaft 2. Since the armature 7 is rotated at a constant speed, it will produce a constant potential across the resistance 15. The speed of the armature 7 is the same as the highest speed of the shaft 2 multiplied by the gear ratio between the shaft 2 and the armature 5. When starting, the speed of the shaft 2 is zero so that the potential across resistance 14 will be zero; the contact 16 will then be in engagement with terminal 30 so that the voltage across coil 25 will also be zero. The armature 23, being biased into neutral position, will leave the motor 18 deenergized so that the pointer 32 will be stationary and in its zero position. When the shaft 2 commences to revolve, a potential will be produced across the resistance 14 all of which will be impressed across relay coil 25 since the contact 16 will still be in engagement with terminal 30. Relay armature 23 will therefore be operated, closing the circuit to one of the field windings, say 21, thereby causing the motor armature 19 to rotate and simultaneously rotating pointer 32 in a clockwise direction and moving contact 16 upwards along resistance 15. When contact 16 reaches a position such that the potential between the pointer and terminal 30 is equal to the potential across the resistance 14, the relay coil 25 will again be deenergized, thereby stopping the motor 18 and stopping the motion of contact 16 and pointer 32. Should the speed of shaft 2 decrease, the potential across resistance 14 will also decrease so that it will be less than the potential between contact 16 and terminal 30. The polarity of the potential now impressed on relay coil 25 will thereby be reversed, causing armature 23 to engage contact 26 and energize field winding 20 whereby the motor armature 19 will rotate in the reverse direction moving the pointer 32 counter-clockwise and contact 16 downwards along resistance 15 until the opposed voltages again become equal. If, in response to an increase in speed of the shaft 2, the armature 19 should move the contact 16 too far upwards along resistance 15, the polarity impressed across the relay coil 25 will reverse, thereby causing the motor to reverse. Any hunting which may take place will, however, be very small in amount and practically insignificant if the potentiometer resistance 15 be properly designed.

It will be noted that by means of the above arrangement a direct continuous indication of speed can be obtained at all times. Moreover, the speed indication is independent of the strength of the magnetic field produced by the magnet 10 and the accuracy of indication depends only upon the accuracy with which the speed of the driving motor 8 can be maintained constant. Since, however, a constant frequency source of alternating current is readily available, the over-all accuracy of speed measurement is relatively high.

It will readily be understood that in place of the relay 22 any similar device may be used which will serve to translate the difference in voltage between resistor 14 and the selected portion of resistor 15, that is the voltage between contact 16 and terminal 30, into an exciting current for the operation of motor 18 in one direction or the other. For example, the modification shown in Fig. 2 may be used. Here the terminals 29 and 30, which are the same as those of Fig. 1, are shunted by a center-tapped resistor 31 whose extremities are connected to the grids of two grid-controlled rectifiers 34 and 35. The cathodes of the rectifiers are connected together and through bias battery 36 to the resistor center tap. The anodes are connected to the free ends of the motor field windings 20 and 21; and the common terminal of the latter is connected through an alternating current source to the rectifier cathodes.

When the difference potential across terminals 29 and 30 is in one direction, the grid of tube 34 is positive so that current passes through field winding 20, causing the motor 18 to revolve in one direction; at the same time the grid of tube 35 is negative so that winding 21 is not excited. When the polarity of the potential across terminals 29 and 30 is reversed, the grid of tube 34 becomes negative, the grid of tube 35 becomes positive and motor 18 rotates in the reverse direction. The motor 18 is, of course, mechanically connected to contact 16 and pointer 32 as in Fig. 1. The bias battery 36 is just sufficient to maintain both grids at cut-off potential when the voltage 29—30 is zero. With some types of reversible motors the bias battery may be eliminated, both tubes passing current when the voltage 29—30 is zero, the field windings 20, 21 being so arranged that when both are excited, the rotor 19 remains stationary.

While my invention has been described as applied to the measurement of propeller shaft speed and is particularly adapted to this purpose, it can, of course, also be used for the measurement and indication of the speed of other rotating machinery.

Having now described my invention, I claim:

1. A shaft speed measuring system including an electric generator having two similar armatures immersed in the same magnetic field, means driving one of said armatures at a speed proportional to the speed to be measured, means driving the second armature at a constant speed, a pair of resistors, means for impressing the output voltage of the first generator across one of said resistors, means for impressing the output voltage of the second generator across the second of said resistors, means for selecting a portion of the voltage drop across the second resistor, said means including a reversible motor, means for driving said motor in one direction or the other as the algebraic difference between said first voltage and said selected voltage portion is of one polarity or the other, means mechanically coupling said motor to drive said selecting means and an indicator operated by said motor.

2. A shaft speed measuring system including an electric generator having two similar armatures immersed in the same magnetic field, means driving one of said armatures at a speed proportional to the speed to be measured, means driving the second armature at a constant speed, a pair of resistors, means for impressing the output voltage of the first generator across one of said resistors, means for impressing the output voltage of the second generator across the second of said resistors, means for selecting a portion of the voltage drop across the second resistor, said means including a reversible motor, a neutral polarized relay having an operating coil and contacts operated thereby, said contacts being in circuit with said motor and a source of energy for operating said motor in one direction when said coil is energized in one polarity and in the other direction when said coil is energized in the opposite polarity, means energizing said coil from the algebraic difference between said first voltage and said selected voltage portion, means mechanically coupling said motor to drive said selecting means and an indicator operated by said motor.

3. A shaft speed measuring system including an electric generator having two similar armatures immersed in the same magnetic field, means driving one of said armatures at a speed proportional to the speed to be measured, means driving the second armature at a constant speed, a reversible motor, means comparing the output voltage of the first armature with a portion of the output voltage of the second armature, means responsive to the difference between said first armature voltage and said second armature voltage portion for driving said motor in one direction or the other in accordance with the polarity of said voltage difference, means operated by the motor for varying the said second armature voltage portion to equal the first armature voltage and indicating means driven by said motor to indicate the amount of variation required and thereby the speed being measured.

4. A shaft speed measuring system including a pair of electric generators adapted to produce equal voltages for equal speeds, means driving one of said generators at a speed proportional to the speed to be measured, means driving the second generator at a constant speed, means comparing the output voltage of the first generator with a portion of the output voltage of the second generator, means responsive to the difference between the first generator voltage and the second generator voltage portion for varying the second generator voltage portion to equal the first generator voltage, and indicating means adapted to indicate the amount of variation required and thereby the speed being measured.

5. A shaft speed measuring system including a pair of electric generators adapted to produce equal voltages for equal speeds, means driving one of said generators at a speed proportional to the speed to be measured, means driving the second generator at a constant speed, a reversible motor, means comparing the output voltage of the first generator with a portion of the output voltage of the second generator, means responsive to the difference between said first generator voltage and said second generator voltage portion for driving said motor in one direction or the other in accordance with the polarity of said voltage difference, means operated by the motor for varying the second generator voltage portion to equal the first generator voltage, and indicating means driven by said motor to indicate the amount of variation required and thereby the speed being measured.

6. A shaft speed measuring system including a pair of electric generators adapted to produce equal voltages for equal speeds, means driving one of said generators at a speed proportional to the speed to be measured, means driving the second generator at a constant speed, a pair of resistors, means for impressing the output voltage of the first generator across one of said resistors, means for impressing the output voltage of the second generator across the second of said resistors, means for selecting a portion of the voltage drop across the second resistor, said means including a reversible motor, means for driving said motor in one direction or the other as the algebraic difference between said first voltage and said selected voltage portion is of one polarity or the other, means mechanically coupling said motor to drive said selecting means and an indicator operated by said motor.

7. A shaft speed measuring system including a pair of electric generators adapted to produce equal voltages for equal speeds, means driving one of said generators at a speed proportional to the speed to be measured, means driving the second generator at a constant speed, a resistor, means for impressing the output voltage of the second generator across said resistor, means for selecting a portion of the voltage drop across said resistor, a reversible motor, means for driving said motor including a pair of grid controlled rectifiers, a source of anode potential therefor, means connecting one of said rectifiers to drive said motor in one direction, means connecting the other of said rectifiers to drive said motor in the opposite direction, a center tapped resistor having its extremities connected to the grids of said rectifiers respectively and its center tap connected to the cathodes of both rectifiers and means for impressing across said resistor the algebraic difference between said first generator voltage and said selected voltage portion, means mechanically coupling said motor to drive said selecting means and an indicator operated by said motor.

8. A shaft speed measuring system including a pair of electric generators adapted to produce equal voltages for equal speeds, means driving one of said generators at a speed proportional to the speed to be measured, means driving the second generator at a constant speed, means for selecting a portion of the output voltage of the second generator, a reversible motor, means for driving said motor in one direction or the other as the algebraic difference between said first generator voltage and said selected voltage portion is of one polarity or the other, means mechanically connecting said motor to operate said selecting means and means for indicating the position of said selecting means.

HOWARD A. SATTERLEE.